United States Patent
Li et al.

(10) Patent No.: US 8,421,773 B2
(45) Date of Patent: Apr. 16, 2013

(54) RESISTIVE TOUCH PANEL AND DRIVING METHOD THEREFOR

(75) Inventors: Jyun-Sian Li, Tainan (TW); Chih-Chang Lai, Tai Chung County (TW); Ting-Yu Chang, Kao Hsiung County (TW)

(73) Assignee: Wintek Corporation, Taichung (TW)

( * ) Notice: Subject to any disclaimer, the term of this patent is extended or adjusted under 35 U.S.C. 154(b) by 212 days.

(21) Appl. No.: 12/956,947

(22) Filed: Nov. 30, 2010

(65) Prior Publication Data

US 2011/0134072 A1    Jun. 9, 2011

(30) Foreign Application Priority Data

Dec. 4, 2009  (TW) ................................ 98141572 A

(51) Int. Cl.
    *G06F 3/045* (2006.01)
(52) U.S. Cl.
    USPC ....................................... 345/174; 178/18.05
(58) Field of Classification Search .................... 345/173
    See application file for complete search history.

(56) References Cited

U.S. PATENT DOCUMENTS

| | | | | |
|---|---|---|---|---|
| 5,844,175 | A | * | 12/1998 | Nakanishi et al. ......... 178/18.03 |
| 6,727,893 | B2 | * | 4/2004 | Kao ............................. 345/173 |
| 2009/0322699 | A1 | * | 12/2009 | Hansson ...................... 345/174 |
| 2010/0001977 | A1 | * | 1/2010 | Lin et al. ..................... 345/174 |
| 2010/0053094 | A1 | * | 3/2010 | Kong et al. .................. 345/173 |

* cited by examiner

*Primary Examiner* — Quan-Zhen Wang
*Assistant Examiner* — Chad Dicke
(74) *Attorney, Agent, or Firm* — Muncy, Geissler, Olds & Lowe, PLLC

(57) ABSTRACT

A resistive touch panel includes a first substrate, a second substratem and a driving circuit. A first conductive layer is disposed on the first substrate and includes a first, a second, a third, and a fourth corners which are different from each other. A first, a second, a third, and a fourth conducting wires are electrically connected to the first, second, third, and fourth corners, respectively. The second substrate is disposed parallel to the first substrate. A second conductive layer is disposed on the second substrate and faces the first conductive layer. A fifth conducting wire is electrically connected to a first side of the second conductive layer while a sixth conducting wire is electrically connected to a second side of the second conductive layer. The driving circuit is electrically connected to the first, second, third, fourth, fifth, and sixth conducting wires.

19 Claims, 5 Drawing Sheets

RESISTIVE TOUCH PANEL AND DRIVING METHOD THEREFOR

BACKGROUND OF THE INVENTION (a) Field of the Invention

The invention relates to a driving method, particularly to a driving method for a resistive touch panel.

(b) Description of the Related Art

In general, a four-wire or five-wire type resistive touch panel is extensively used in various touch-control electronic products. However, confined to its established architecture, the four-wire or five-wire type resistive touch panel fails to detect a multi-touch operation.

BRIEF SUMMARY OF THE INVENTION

The invention provides a driving method for a resistive touch panel capable of accurately recognizing a single-touch operation or a multi-touch operation performed on a six-wire type resistive touch panel and accurately interpreting each gesture for the multi-touch operation.

According to an embodiment of the invention, a resistive touch panel includes a first substrate, a second substrate, a first conductive layer, a second conductive layer, a first, a second, a third, a fourth, a fifth and a sixth conducting wires, and a driving circuit. The first conductive layer is disposed on the first substrate and includes a first, a second, a third, and a fourth corners that are different from each other. The first conducting wire is disposed on the first substrate and electrically connected to the first corner. The second conducting wire is disposed on the first substrate and electrically connected to the second corner. The third conducting wire is disposed on the first substrate and electrically connected to the third corner. The fourth conducting wire is disposed on the first substrate and electrically connected to the fourth corner. The second substrate is disposed parallel to the first substrate. The second conductive layer is disposed on the second substrate and faces the first conductive layer. The fifth conducting wire is electrically connected to a first side of the second conductive layer. The sixth conducting wire is electrically connected to a second side of the second conductive layer. The driving circuit is electrically connected to the first, second, third, fourth, fifth, and sixth conducting wires.

Further, the invention also provides a driving method used for driving a resistive touch panel recited in the above embodiment. The driving method includes the following steps. A first voltage is supplied to the sixth conducting wire and a second voltage is supplied to the second conducting wire, where the first voltage is larger than the second voltage. When the touch panel is touched, a first-state detection voltage is outputted by the fifth conducting wire and a second-state detection voltage is outputted by the fourth conducting wire. According to the first-state detection voltage and the second-state detection voltage, a contact resistance is calculated out. It is determined whether a single-touch operation or a multi-touch operation is performed according to the contact resistance. When a multi-touch operation is performed, different multi-points on the touch panel are away from each other or close to each other according to the comparison of a current contact resistance with a previous contact resistance. Thereby, gestures performed on the resistive touch panel are recognized.

Other objects and advantages of the invention can be better understood from the technical characteristics disclosed by the invention. In order to clarify the above mentioned and other objects and advantages of the invention, examples accompanying with figures are disposed and described in details in the following.

DETAILED DESCRIPTION OF THE INVENTION

Figure 1A:
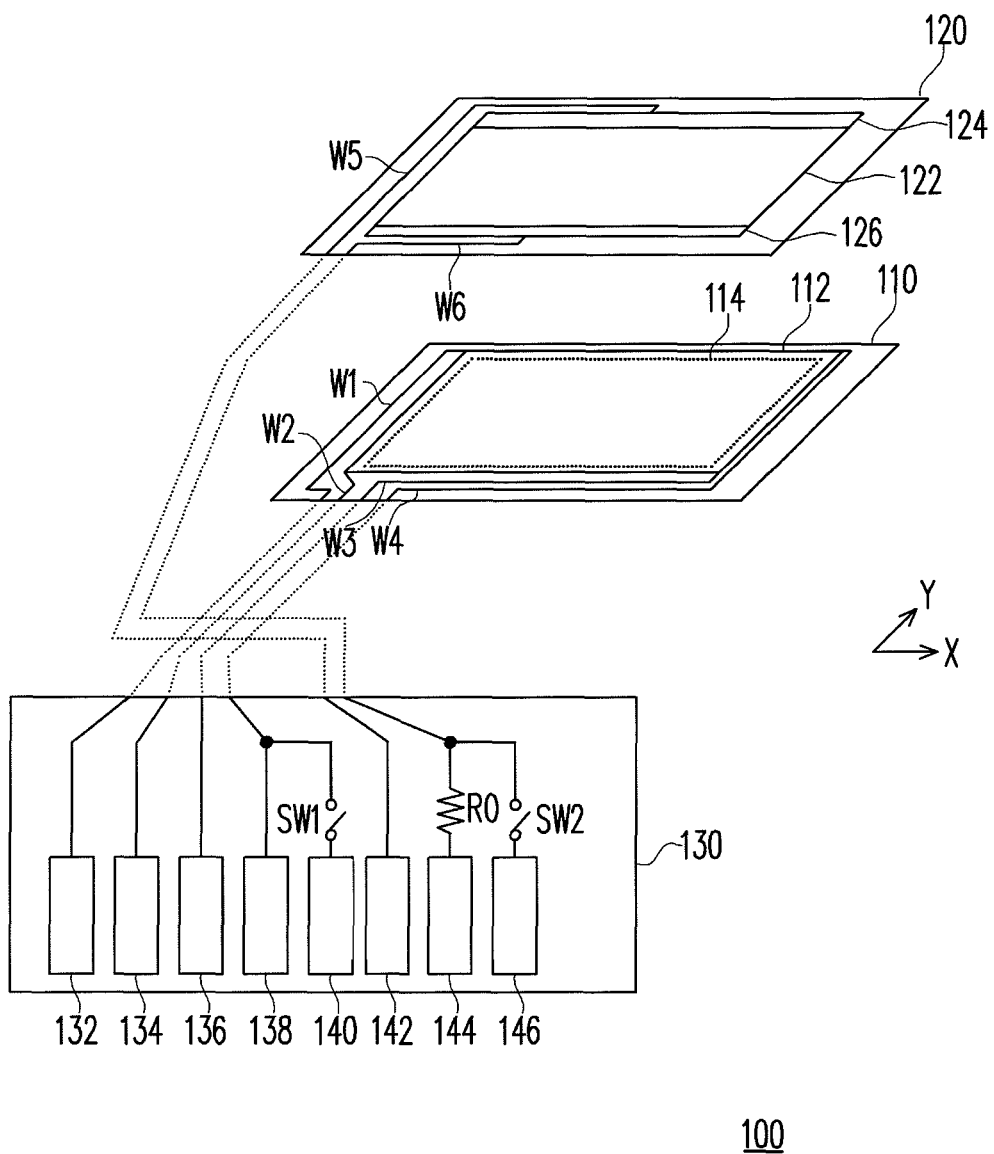
FIG. 1A shows a schematic diagram illustrating a touch panel according to an embodiment of the invention.

FIG. 1A shows a schematic diagram illustrating a touch panel according to an embodiment of the invention. Referring to FIG. 1A, the touch panel 100 includes a substrate 110, a substrate 120, and a driving circuit 130. The touch panel 100 in this embodiment may be a resistive touch panel. On a surface of the substrate 110 facing the substrate 120, a transparent conductive layer 112 and conducting wires W1, W2, W3 and W4 are disposed. As shown in FIG. 1A, the portion on the upper left corner of the transparent conductive layer 112 is electrically connected to the conducting wire W1, the portion on the lower left corner is electrically connected to the conducting wire W2, the portion on the lower right corner is electrically connected to the conducting wire W3, and the portion on the upper right corner is electrically connected to the conducting wire W4. Thus, the portion on each corner of the transparent conductive layer 112 is electrically connected to the driving circuit 130 separately through each conducting wire W1, W2, W3 and W4. That is, the transparent conductive layer 112 is substantially a rectangular conductive layer, and the four corners of the transparent conductive layer 112 are electrically connected to the driving circuit 130 through the conducting wires W1, W2, W3 and W4, respectively.

Besides, on the periphery of the transparent conductive layer 112, a plurality of conductor patterns 114 are disposed on and in direct contact with the transparent conductive layer 112 to prevent an electric field on the side of the transparent conductive layer 112 from being deformed due to the resistance characteristic of the transparent conductive layer 112. The material of the conductor patterns 114 may be metal such as silver. In this embodiment, the conductor patterns 114 (indicated by dashed lines) may include a plurality of straight line segments, bended line segments, or curved line segments.

On the surface of the substrate 120 facing the substrate 110, a transparent conductive layer 122, a conductor stripe 124, and a conductor stripe 126 are disposed. The conductor stripe 124 is disposed on one side of the transparent conductive layer 122 and directly in contact with the transparent conductive layer 122. The conductor stripe 126 is formed on an opposite side of the transparent conductive layer 122 and directly in contact with the transparent conductive layer 122. In addition, conducting wires W5 and W6 are connected to the conductor stripes 124 and 126, respectively.

It should be noted that the wording upper, lower, right or left mentioned in the above description is uses to illustrate an embodiment with reference to a figure for convenience, but not limit the scope of the invention.

In this embodiment, the driving circuit 130 may be connected to the touch panel 100 externally or built inside the substrate 110 or the substrate 120. In the driving circuit 130, the driver 132 is electrically connected to the conducting wire W1, the driver 134 is electrically connected to the conducting wire W2, the driver 136 is electrically connected to the conducting wire W3, the driver 138 is electrically connected to the conducting wire W4, the detector 140 is electrically connected to the conducting wire W4 through a switch SW1, the detector 142 is electrically connected to the conducting wire W5, the driver 144 is electrically connected to the conducting wire W6 through a resistor R0, and the detector 146 is electrically connected to the conducting wire W6 through a switch SW2. In this embodiment, the drivers 132, 134, 136, 138 and 144 may output a system voltage or a ground voltage, or they may be in a high-impedance (Hi-Z) state. The detectors 140, 142, and 146 may be used to detect voltage values and have high input impedance.

Figure 1B:
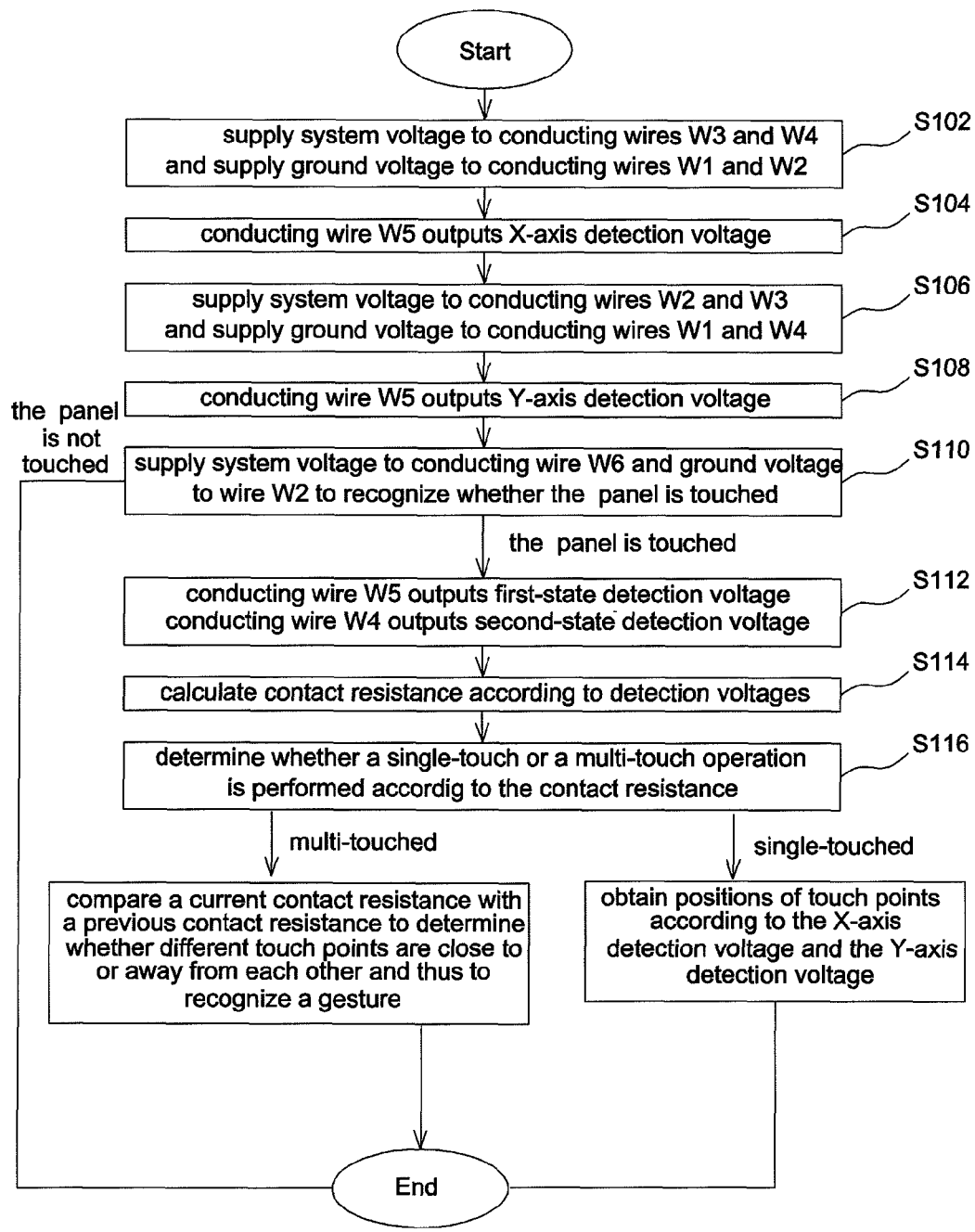
FIG. 1B shows a flow chart illustrating a driving method for the touch panel shown in FIG. 1A.

Please refer to FIGS. 1A and 1B, where it is assumed that a single-touch operation is performed on the touch panel 100. First, the drivers 136 and 138 supply the system voltage separately to the conducting wires W3 and W4, and the drivers 132 and 134 supply the ground voltage separately to the conducting wires W1 and W2 (step S102). At the time, the driver 144 is under the Hi-Z state, and the switches SW1 and SW2 are turned off to obtain a detection voltage on the touch point with respect to the X axis.

Specifically, the voltage on the right-hand side is higher than the voltage on the left-hand side of the transparent conductive layer 112. When a touch operation is performed, the transparent conductive layer 112 and the transparent conductive layer 122 are conducted at the touch point. Therefore, the voltage division at the touch point is transmitted to the conductor stripe 124 of the substrate 120 and finally to the detector 142 through the conducting wire W5 (step S104), where the voltage division equals a detection voltage on the X-axis. When the touch point is closer to the left-hand side of the transparent conductive layer 112, the detection voltage on the X-axis becomes much closer to the ground voltage. Therefore, the magnitude of the detection voltage can be used to determine the position of the touch point.

Then, the drivers 134 and 136 supply the system voltage to the conducting wires W2 and W3, respectively, and the drivers 132 and 138 respectively supply the ground voltage to the conducting wires W1 and W4 (step S106). At the time, the driver 144 is under the Hi-Z state and the switches SW1 and SW2 are off, so that the detection voltage at the touch point corresponding to the Y axis can be detected. Similarly, the detector 142 receives the detection voltage on the Y-axis (step S108).

Additionally, the touch panel 100 according to this embodiment may recognize different touch modes and different gestures of a user. For example, the driving circuit 130 is set under the following conditions to recognize a touch mode. The driver 144 supplies the system voltage to the conducting wire W6, and the driver 134 supplies the ground voltage to the conducting wire W2 (step S110). The drivers 132, 136, and 138 are each under the Hi-Z state. In addition, the switches SW1 and SW2 are turned on. Under the circumstance, it can be recognized that whether the touch panel 100 is touched and that whether a single-touch operation or a multi-touch operation is performed.

Figure 2A:
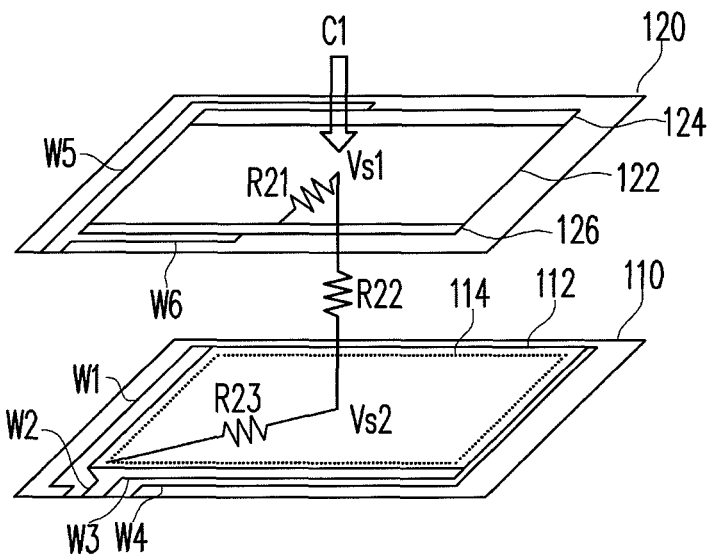
FIG. 2A shows a schematic diagram illustrating a single-touch operation for the touch panel shown in FIG. 1A.
Figure 2B:
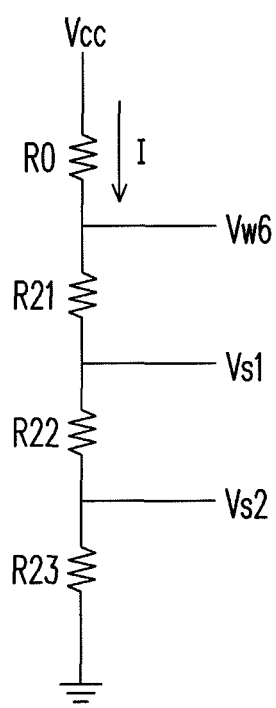
FIG. 2B shows a schematic diagram illustrating an equivalent circuit of FIG. 2A.

Specifically, FIG. 2A shows a schematic diagram illustrating a single-touch operation performed on the touch panel shown in FIG. 1A. FIG. 2B shows a schematic diagram illustrating an equivalent circuit of FIG. 2A. Referring to FIGS. 1A and 2A, when a user touches the point C1, the touch point C1 on the transparent conductive layers 112 and 122 forms a resistor R22 (having a contact resistance), a resistor R23 forms between the touch point C1 and the conducting wire W2, and a resistor R21 forms between the touch point C1 and the conducting wire W6, where the above resistors are used to represent the impedance characteristics of the transparent conductive layers 112 and 122.

Please refer to both FIGS. 1A and 2B, since the driver 144 is electrically connected to the conducting wire W6 through the resistor R0, the resistor R0 is serially connected to the resistors R21, R22, and R23. A node between the resistors R0 and R21 outputs a voltage Vw6, a node between the resistors R21 and R22 outputs a first-state detection voltage Vs1, and a node between the resistors R22 and R23 outputs a second-state detection voltage Vs2. The voltage Vw6, the first-state detection voltage Vs1, the second-state detection voltage Vs2 are transmitted to the detectors 146, 142, and 140, respectively (step S112).

It is assumed that the system voltage Vcc is 3.3V, the resistor R0 is 300Ω, the voltage Vw6 is 2.36V, the first-state detection voltage Vs1 is 1.97V, and the second-state detection voltage Vs2 is 0.875V. According to the above data, the current I flowing through the conducting wire W6 is calculated to be (3.3−2.36)/300=3.13 mA. Then, the current I and the state detection voltages Vs1 and Vs2 are used to calculate the contact resistance of the resistor R22 (step S114); that is, the contact resistance is (1.97−0.875)/3.13=350Ω.

As described in the above, when the touch panel 100 is initialized, a user is guided to perform a single-touch operation (that is, the touch panel 100 is under a single-point touched state). Therefore, during initialization, the touch panel 100 stores the calculated contact resistance as a preset contact resistance. When the touch panel 100 is under a multi-point touched state, the current flow path under the multi-point touched state is different from that under the single-point touched state, and thus the impedance distribution is also different. The touch panel 100 compares a currently received contact resistance with the preset contact resistance to determine whether a single-touch operation or a multi-touch operation is performed (step S116).

Besides, an impedance threshold value can be set to clearly distinguish either a single-touch operation or a multi-touch operation is performed. The impedance threshold value can be set as a weighted contact resistance; that is, the impedance threshold value is the product of a preset contact resistance and a ratio, and the ratio is in the range of 0.3-0.8 selected according to the circuit design.

When the touch panel 100 is under a single-point touched state, by the step S102 to the step 108, the positions of the touch points on the X-axis and Y-axis are obtained respectively according to the X-axis detection voltage and the Y-axis detection voltage (step S118). This positioning process is similar to a positioning method used in a five-wire type touch panel and well known to those skilled in the art. Thus, the details will not be given hereinafter.

When the touch panel 100 is under the multi-point touched state, according to this embodiment, a current contact resistance is compared with a previous contact resistance to determine whether different touch points are close to or away from each other (step S120). Besides, when the touch panel 100 is not touched, the voltage acquired by the detector 146 in the driving circuit 130 is equal to the system voltage outputted by the driver 144. Thus, when the touch panel 100 is not touched, the execution flow is in the order of steps S102, S104, S106, S108 and then ends in the step S110. The following will describe the method to determine whether different touch points tend to be close to or away from each other.

Figure 3A:
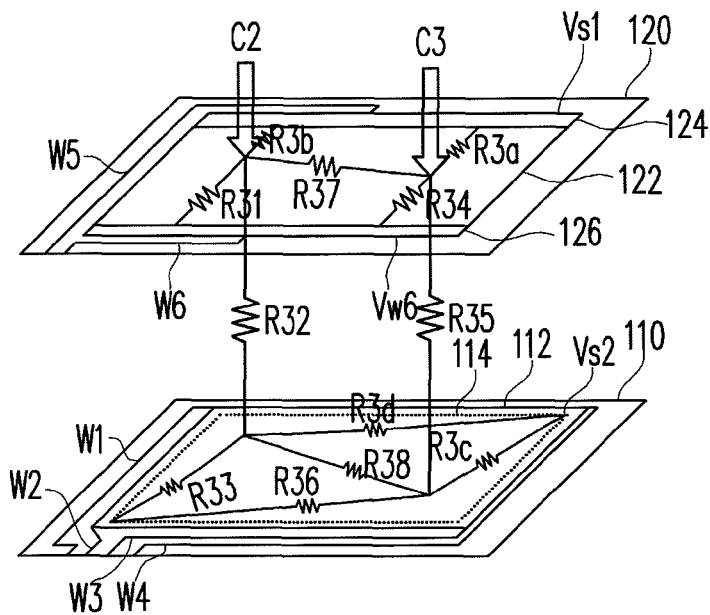
FIG. 3A shows a schematic diagram illustrating a multi-touch operation for the touch panel shown in FIG. 1A.
Figure 3B:
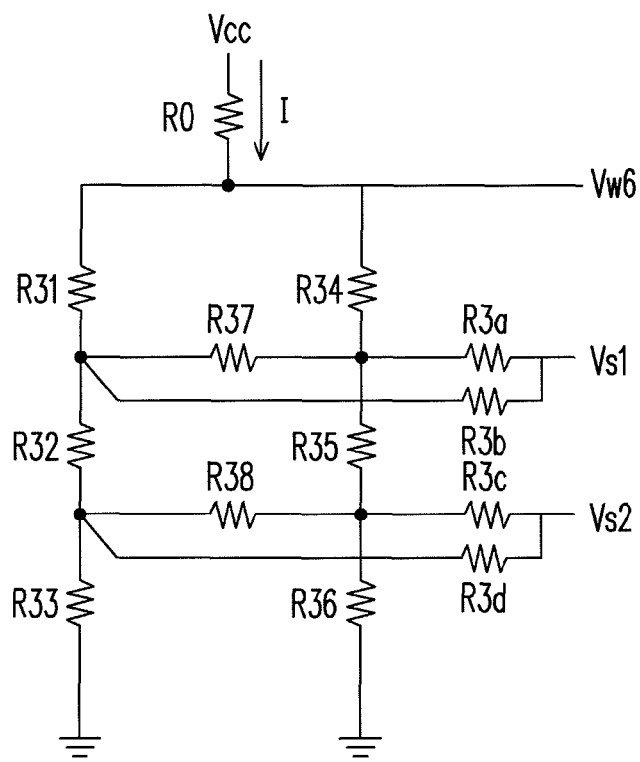
FIG. 3B shows a schematic diagram illustrating an equivalent circuit of FIG. 3A.

FIG. 3A shows a schematic diagram illustrating a multi-touch operation performed on the touch panel shown in FIG. 1A. FIG. 3B shows a schematic diagram illustrating an equivalent circuit of FIG. 3A. In one embodiment, the touch panel shown in FIG. 1A may be a six-wire type resistive touch panel. Referring to FIG. 3A, when a user touches points C2 and C3, the contact points on the transparent conductive layers 112 and 122 form resistors R32 and R35. Resistors R33 and R36 are formed between the touch points C2 and C3 and the conducting wire W2, resistors R3$d$ and R3$c$ are formed between the touch points C2 and C3 and the conducting wire W4, resistors R3$b$ and R3$a$ are formed between the touch points C2 and C3 and the conducting wire W5, resistors R31 and R34 are formed between the touch points C2 and C3 and the conducting wire W6, and resistors R37 and R38 are formed between the touch point C2 and C3 on the transparent conductive layers 112 and 122, respectively.

Referring to FIG. 3B, in the step S112, since the touch panel 100 is touched, the voltage Vw6, the state detection voltage Vs1 and the state detection voltage Vs2 are outputted. It is assumed that the system voltage Vcc is 3.3V, the resistor R0 is 300Ω, the voltage Vw6 is 1.82V, the first-state detection voltage Vs1 is 1.55V, and the second-state detection voltage Vs2 is 0.742V. According to the above data, a current I is calculated to be (3.3−1.82)/300=4.92 mA, and then the contact resistance is (1.55−0.742)/4.92=164.2Ω. Under the multi-point touched state, the calculated contact resistance is an equivalent resistance between the conducting wires W4 and W5 but not an actual resistance of the resistor R32 or R35. From the calculated result, the contact resistance (=164.2Ω) under the multi-point touched state is far smaller than a preset contact resistance (=350Ω), so that the touch panel 100 is recognized as a multi-touch operation being performed.

Figure 4A:
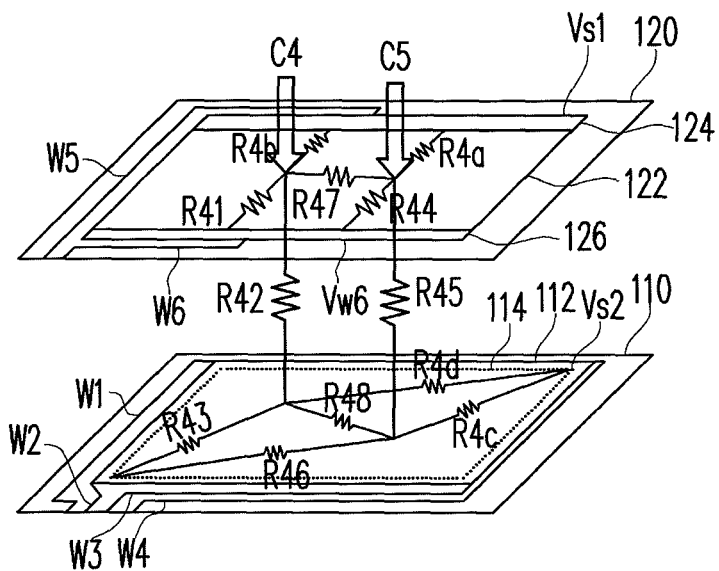
FIG. 4A shows a schematic diagram illustrating another multi-touch operation for the touch panel shown in FIG. 1A.
Figure 4B:
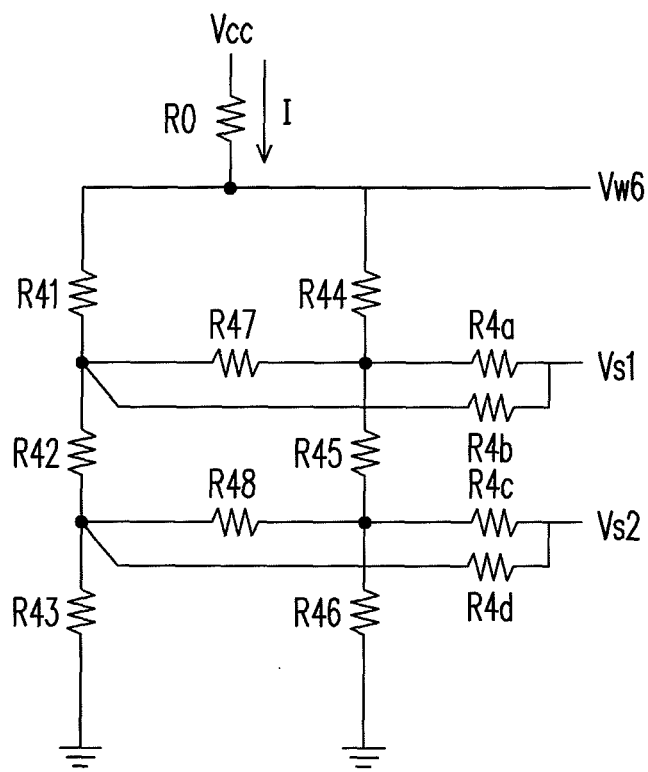
FIG. 4B shows a schematic diagram illustrating an equivalent circuit of FIG. 4A.

Besides, under the multi-point touched state, the resistance of the resistor between different touch points varies due to the different distances between different touch points, and thus this may affect the magnitude of the contact resistance (an equivalent resistance between the conducting wires W4 and W5) and the state detection voltages Vs1 and Vs2. FIG. 4A shows a schematic diagram illustrating another multi-touch operation performed on the touch panel shown in FIG. 1A. FIG. 4B shows a schematic diagram illustrating an equivalent circuit of FIG. 4A. Referring to FIGS. 3A and 4A, the distribution of the resistors of FIG. 4A is similar to that of FIG. 3A. Thus, the details will not be given hereinafter. The distance between the touch points C4 and C5 is smaller than the distance between the touch points C2 and C3. In that case, referring to FIG. 4B, the voltage Vw6 is 1.83V, the first-state detection voltage Vs1 is 1.54V, and the second-state detection voltage Vs2 is 0.685V. According to the above data, a current I is calculated to be (3.3−1.83)/300=4.89 mA, and then the contact resistance is (1.55−0.685)/4.89=174.8Ω.

Therefore, when different touch points become closer, the calculated contact resistance also becomes higher. Thus, under the multi-point touched state, when a current contact resistance is larger than a previous contact resistance, it means that different touch points are approaching to close to each other. On the contrary, when a current contact resistance is smaller than a previous contact resistance, it means that different touch points are moving away from each other. Thus, a gesture performed on the touch panel is recognized to conduct a corresponding operation (such as shrinking or enlarging an image). It should be noted that the voltage values and the resistance values described in the above are only examples but not used to limit the scope of the invention.

In conclusion, the resistive touch panel and the driving method according to the above embodiments form an architecture of a six-wire type resistive touch panel. The detectors are used to acquire a first state detection voltage and a second state detection voltage, and then a contact resistance is calculated according to the first and the second state detection voltages.

The contact resistance is used to determine whether a single-touch or a multi-touch operation is performed. Under a multi-point touched state, a current contact resistance is compared with a previous contact resistance to determine whether different touch points are approaching to close to each other or moving away from each other. Thus, the resistive touch panel is allowed to recognize a gesture of a user performed thereon and conduct a corresponding operation according to the recognized gesture.

Although the present invention has been fully described by the above embodiments, the embodiments should not constitute the limitation of the scope of the invention. Various modifications or changes can be made by those who are skilled in the art without deviating from the spirit of the invention.

What is claimed is:

1. A driving method used for driving a resistive touch panel, the resistive touch panel including a first substrate, a first conductive layer disposed on the first substrate and comprising a first corner, a second corner, a third corner, and a fourth corner different from each other, a first conducting wire disposed on the first substrate and electrically connected to the first corner, a second conducting wire disposed on the first substrate and electrically connected to the second corner, a third conducting wire disposed on the first substrate and electrically connected to the third corner, a fourth conducting wire disposed on the first substrate and electrically connected to the fourth corner, a second substrate disposed parallel to the first substrate, a second conductive layer disposed on the second substrate and facing the first conductive layer, a fifth conducting wire electrically connected to a first side of the second conductive layer, a sixth conducting wire electrically connected to a second side of the second conductive layer, and a driving circuit electrically connected to the first, second, third, fourth, fifth, and sixth conducting wires, and the driving method comprising the steps of:

supplying a first voltage to the sixth conducting wire and a second voltage to the second conducting wire, wherein the first voltage is larger than the second voltage;

outputting a first-state detection voltage by the fifth conducting wire and outputting a second-state detection voltage by the fourth conducting wire when the resistive touch panel is touched;

calculating out a contact resistance according to the first-state detection voltage and the second-state detection voltage;

determining whether a single-touch operation or a multi-touch operation is performed according to the contact resistance;

determining, when a multi-touch operation is performed, whether different touch points on the resistive touch panel are approaching to close to each other or moving away from each other according to the comparison between a current contact resistance and a previous contact resistance so as to recognize gestures performed on the resistive touch panel;

supplying the first voltage to the third and fourth conducting wires and the second voltage to the first and the second conducting wires;

outputting a first axial detection voltage by the fifth conducting wire when the resistive touch panel is touched;

supplying the first voltage to the second and third conducting wires and the second voltage to the first and the fourth conducting wires; and outputting a second axial detection voltage by the fifth conducting wire when the resistive touch panel is touched, wherein, when a single-touch operation is performed, a first axial position is recognized according to the first axial detection voltage and a second axial position is recognized according to the second axial detection voltage.

2. The driving method according to claim 1, wherein the step of determining whether a single-touch operation or a multi-touch operation is performed comprises:

comparing the contact resistance with an impedance threshold value, wherein a single-touch operation is performed when the contact resistance is larger than an impedance threshold value, and a multi-touch operation is performed when the contact resistance is smaller than or equal to the impedance threshold value.

3. The driving method according to claim 2, wherein the impedance threshold value is the product of a preset contact resistance and a ratio.

4. The driving method according to claim 3, wherein the ratio is in the range of 0.3-0.8.

5. The driving method according to claim 1, wherein the contact resistance is equal to $(Vs1-Vs2)/I$, where $Vs1$ represents the first-state detection voltage, $Vs2$ represents the second-state detection voltage, and $I$ represents the current flowing through the sixth conducting wire.

6. The driving method according to claim 1, wherein the resistive touch panel is a six-wire type resistive touch panel.

7. The driving method according to claim 1, wherein the resistive touch panel further comprises:

a plurality of conductor patterns disposed on the first substrate, positioned on the periphery of the first conductive layer, and directly in contact with the first conductive layer.

8. The driving method according to claim 7, wherein the conductor patterns are made of silver.

9. The driving method according to claim 1, wherein the resistive touch panel further comprises:

a first conductor stripe disposed on the first side of the second conductive layer and electrically connected to the second conductive layer and the fifth conducting wire; and a second conductor stripe disposed on the second side of the second conductive layer and electrically connected to the second conductive layer and the sixth conducting wire.

10. The driving method according to claim 9, wherein the second side is opposite the first side.

11. The driving method according to claim 1, wherein the resistive touch panel further comprises:

a first driver electrically connected to the first conducting wire;

a second driver electrically connected to the second conducting wire;

a third driver electrically connected to the third conducting wire;

a fourth driver electrically connected to the fourth conducting wire;

a first switch having a first end and a second end, wherein the first end of the first switch is electrically connected to the fourth conducting wire;

a first detector electrically connected to the second end of the first switch;

a second detector electrically connected to the fifth conducting wire;

a resistor, wherein a first end of the resistor is electrically connected to the sixth conducting wire;

a fifth driver electrically connected to a second end of the resistor;

a second switch having a first end and a second end, wherein the first end of the second switch is electrically connected to the sixth conducting wire; and a third detector electrically connected to the second end of the second switch.

12. A driving method used for driving a resistive touch panel, the resistive touch panel including a first substrate, a first conductive layer disposed on the first substrate and comprising a first corner, a second corner, a third corner, and a fourth corner different from each other, a first conducting wire disposed on the first substrate and electrically connected to the first corner, a second conducting wire disposed on the first substrate and electrically connected to the second corner, a third conducting wire disposed on the first substrate and electrically connected to the third corner, a fourth conducting wire disposed on the first substrate and electrically connected to the fourth corner, a second substrate disposed parallel to the first substrate, a second conductive layer disposed on the second substrate and facing the first conductive layer, a fifth conducting wire electrically connected to a first side of the second conductive layer, a sixth conducting wire electrically connected to a second side of the second conductive layer, and a driving circuit electrically connected to the first, second, third, fourth, fifth, and sixth conducting wires, and the driving method comprising the steps of:

supplying a first voltage to the sixth conducting wire and a second voltage to the second conducting wire, wherein the first voltage is larger than the second voltage;

outputting a first-state detection voltage by the fifth conducting wire and outputting a second-state detection voltage by the fourth conducting wire when the resistive touch panel is touched;

calculating out a contact resistance according to the first-state detection voltage and the second-state detection voltage;

comparing the contact resistance with an impedance threshold value to determining whether a single-touch operation or a multi-touch operation is performed, wherein a single-touch operation is performed when the contact resistance is larger than the impedance threshold value, a multi-touch operation is performed when the contact resistance is smaller than or equal to the impedance threshold value, the impedance threshold value is the product of a preset contact resistance and a ratio, and the ratio is in the range of 0.3-0.8; and when a multi-touch operation is performed, determining whether different touch points on the resistive touch panel are approaching to close to each other or moving away from each other according to the comparison between a current contact resistance and a previous contact resistance so as to recognize gestures performed on the resistive touch panel.

13. The driving method according to claim 12, wherein the resistive touch panel further comprises:

a plurality of conductor patterns disposed on the first substrate, positioned on the periphery of the first conductive layer, and directly in contact with the first conductive layer.

14. The driving method according to claim 13, wherein the conductor patterns are made of silver.

15. The driving method according to claim 12, wherein the resistive touch panel further comprises:
   a first conductor stripe disposed on the first side of the second conductive layer and electrically connected to the second conductive layer and the fifth conducting wire; and
   a second conductor stripe disposed on the second side of the second conductive layer and electrically connected to the second conductive layer and the sixth conducting wire.

16. A driving method used for driving a resistive touch panel, the resistive touch panel including a first substrate, a first conductive layer disposed on the first substrate and comprising a first corner, a second corner, a third corner, and a fourth corner different from each other, a first conducting wire disposed on the first substrate and electrically connected to the first corner, a second conducting wire disposed on the first substrate and electrically connected to the second corner, a third conducting wire disposed on the first substrate and electrically connected to the third corner, a fourth conducting wire disposed on the first substrate and electrically connected to the fourth corner, a second substrate disposed parallel to the first substrate, a second conductive layer disposed on the second substrate and facing the first conductive layer, a fifth conducting wire electrically connected to a first side of the second conductive layer, a sixth conducting wire electrically connected to a second side of the second conductive layer, and a driving circuit electrically connected to the first, second, third, fourth, fifth, and sixth conducting wires, and the driving method comprising the steps of:
   supplying a first voltage to the sixth conducting wire and a second voltage to the second conducting wire, wherein the first voltage is larger than the second voltage;
   outputting a first-state detection voltage by the fifth conducting wire and outputting a second-state detection voltage by the fourth conducting wire when the resistive touch panel is touched;
   calculating out a contact resistance according to the first-state detection voltage and the second-state detection voltage;
   determining whether a single-touch operation or a multi-touch operation is performed according to the contact resistance, wherein the contact resistance is equal to $(V_{s1}-V_{s2})/I$, where $V_{s1}$ represents the first-state detection voltage, $V_{s2}$ represents the second-state detection voltage, and I represents the current flowing through the sixth conducting wire; and
   when a multi-touch operation is performed, determining whether different touch points on the resistive touch panel are approaching to close to each other or moving away from each other according to the comparison between a current contact resistance and a previous contact resistance so as to recognize gestures performed on the resistive touch panel.

17. The driving method according to claim 16, wherein the resistive touch panel further comprises:
   a plurality of conductor patterns disposed on the first substrate, positioned on the periphery of the first conductive layer, and directly in contact with the first conductive layer.

18. The driving method according to claim 17, wherein the conductor patterns are made of silver.

19. The driving method according to claim 16, wherein the resistive touch panel further comprises:
   a first conductor stripe disposed on the first side of the second conductive layer and electrically connected to the second conductive layer and the fifth conducting wire; and
   a second conductor stripe disposed on the second side of the second conductive layer and electrically connected to the second conductive layer and the sixth conducting wire.

* * * * *